March 26, 1957 C. W. MARTIN 2,786,691
LOGGING SCOOT
Filed May 9, 1955 3 Sheets-Sheet 1
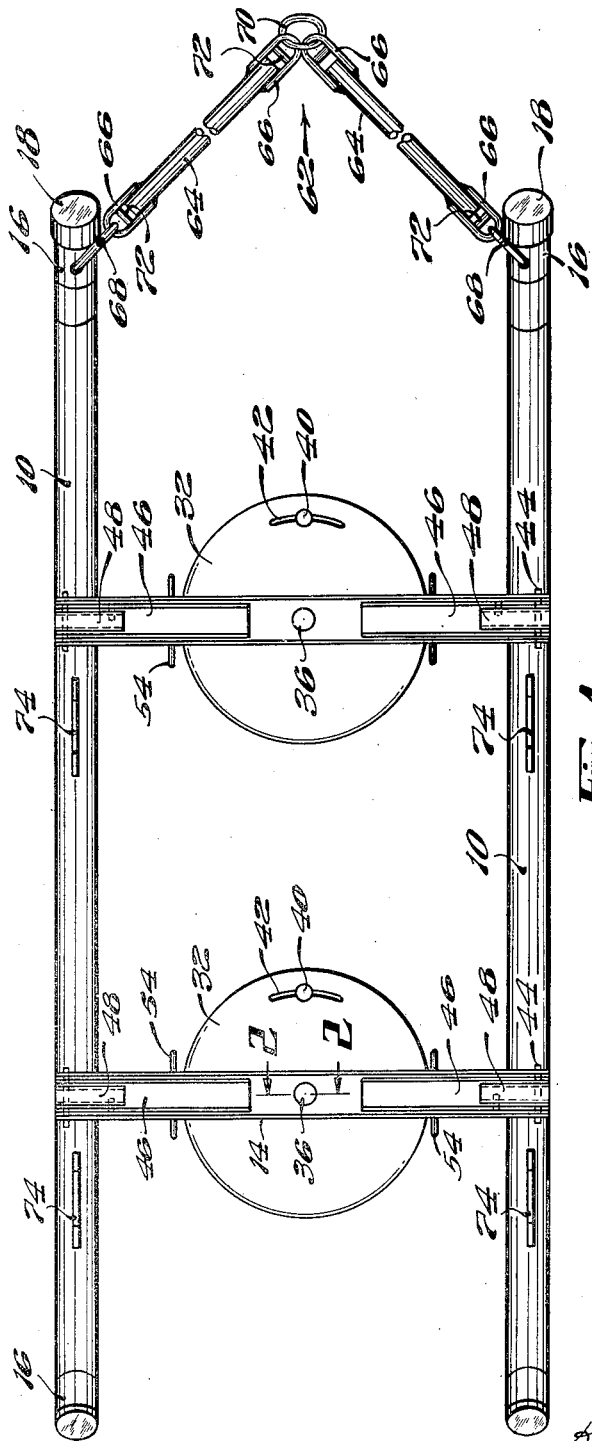
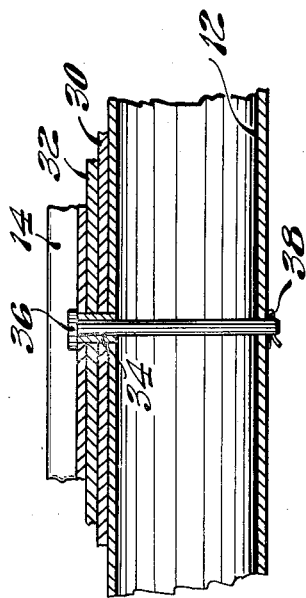
INVENTOR.
CHARLES W. MARTIN
BY
Kenway, Jenney, Witter & Hildreth
ATTORNEYS

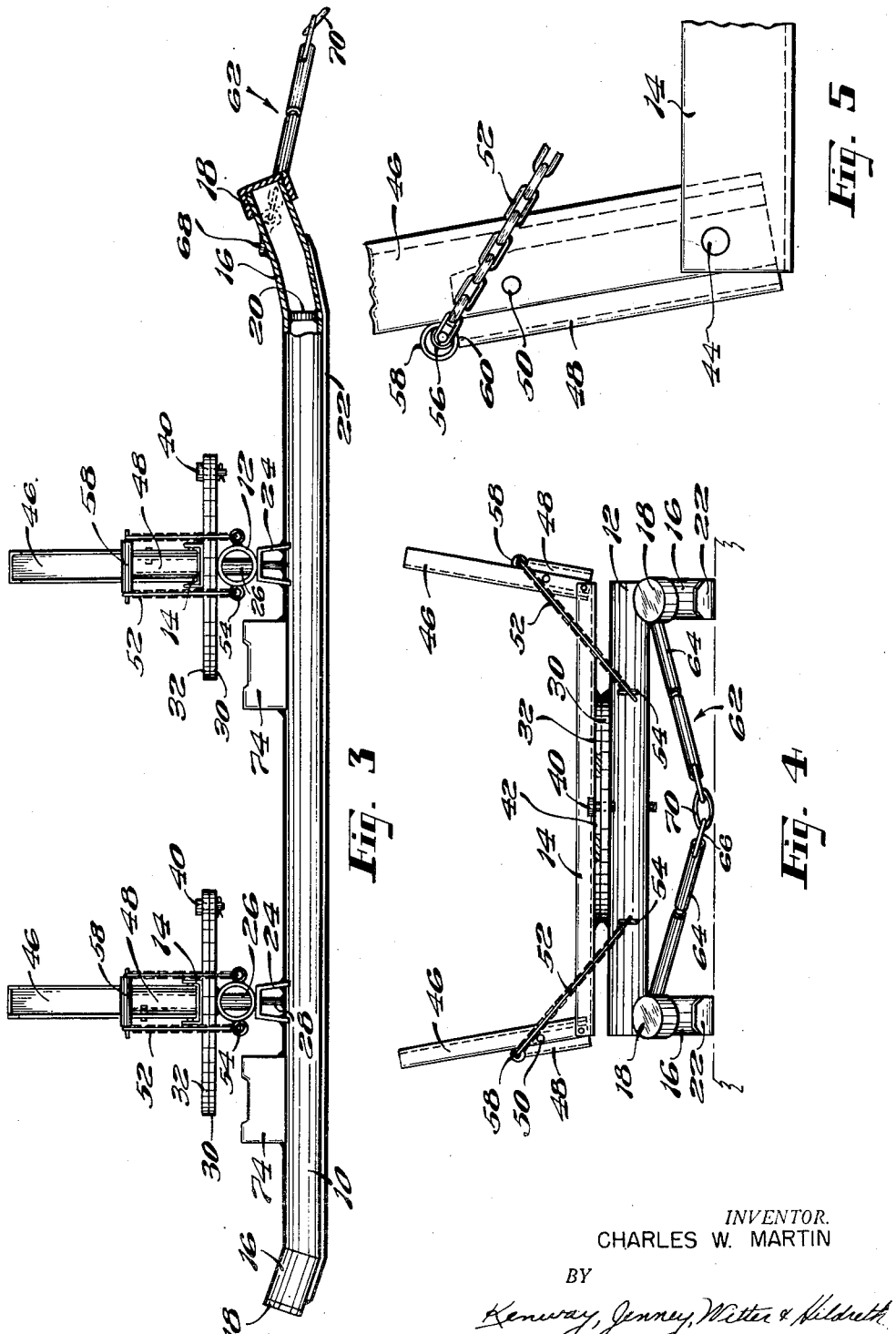

March 26, 1957     C. W. MARTIN     2,786,691
LOGGING SCOOT

Filed May 9, 1955                                3 Sheets-Sheet 3

INVENTOR.
CHARLES W. MARTIN
BY
Kenway, Jenney, Witter & Hildreth
ATTORNEYS

United States Patent Office 2,786,691
Patented Mar. 26, 1957

2,786,691

LOGGING SCOOT

Charles W. Martin, Montville, Maine

Application May 9, 1955, Serial No. 506,970

6 Claims. (Cl. 280—12)

This invention relates to hauling equipment and comprises a new and improved scoot particularly designed to carry timber from the forest to the mill.

Heretofore scoots for hauling logs were crudely fashioned from freshly cut timber. Two parallel logs approximately 14 feet long and having beveled leading edges served as runners while cross ties made of shorter logs were secured to the runners and served as the load supporting members. A chain secured to the leading ends of the runners was connected to a tractor or team of horses to drag the scoot along the ground. The constant racking to which the heavily laden scoots were subjected when dragged across rough terrain made constant repairing necessary. In addition to their lack of physical durability, those scoots had other disadvantages. For example, they had a limited capacity and were excessively heavy.

The primary object of my invention is to provide a scoot which is substantially indestructible.

Another object of my invention is to increase the capacity and decrease the weight of scoots for hauling timber.

Still another object of my invention is to improve the maneuverability of scoots.

My new and improved scoot includes as one important feature a frame comprising cross ties and runners made of five inch iron pipe. The cross ties and runners are pinned together to allow parallelogram action of the frame for steering purposes.

As another feature my new and improved scoot includes a pair of parallel bunks made of channel iron pivotally surmounted on the centers of the cross ties and which serve as load supporting members.

As still another important feature my new and improved scoot includes substantially vertical stakes pivotally connected to the ends of the bunks and which serve both as side rails for the loaded scoot and ramps for loading and unloading the scoot. A novel mechanism which may be tripped without effort supports the stakes in the vertical position.

Figure 6:
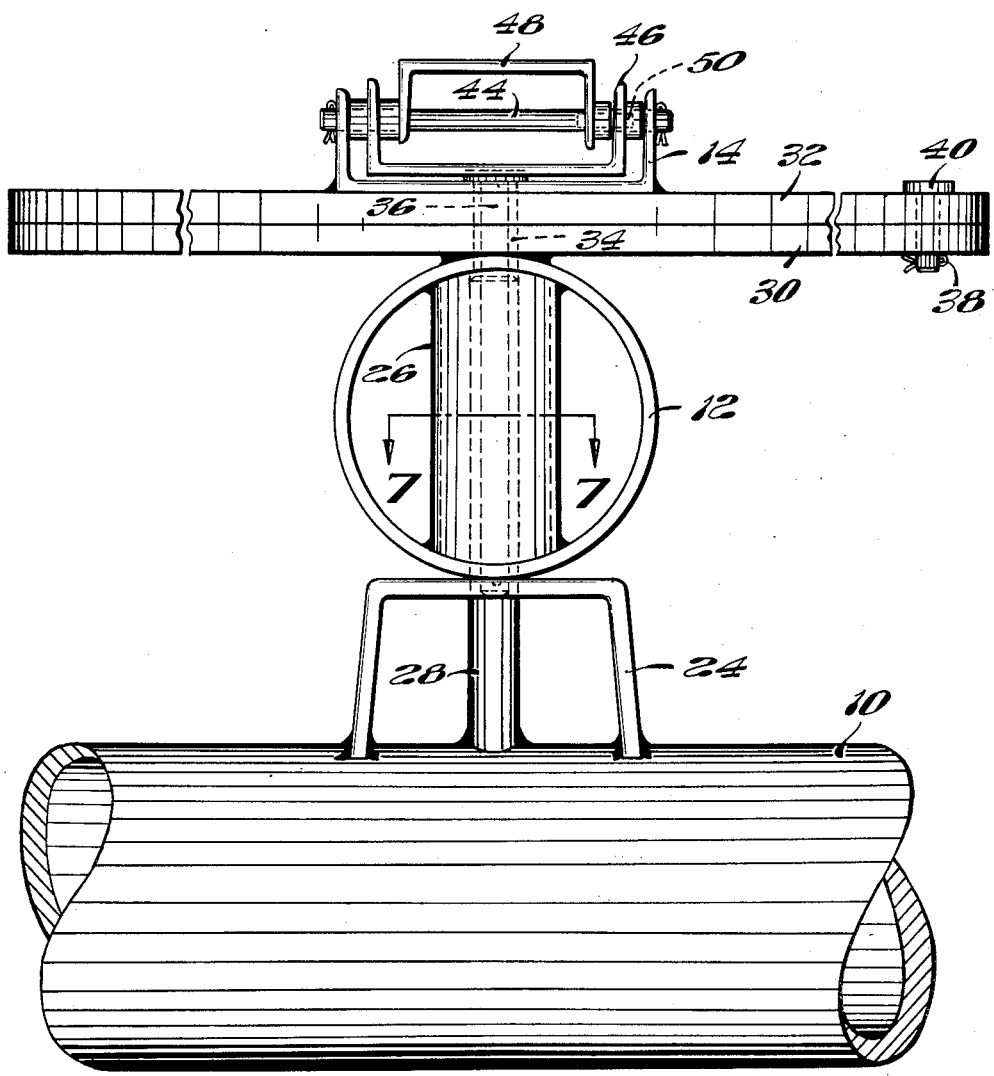
Figure 7:
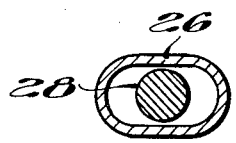

These and other objects and features of my invention, along with its incident advantages, will be better understood and appreciated from the following detailed description of one embodiment thereof selected for purposes of illustration and shown in the accompanying drawing in which:

Fig. 1 is a plan view of a scoot constructed in accordance with my invention,

Fig. 2 is an enlarged detail view in cross-section taken along section line 2—2 of Fig. 1, Fig. 3 is a side elevation view of the scoot illustrated in Fig. 1, showing the stakes in their raised position, Fig. 4 is a view in front elevation of the scoot shown in Fig. 1, Fig. 5 is an enlarged fragmentary view of my new and improved scoot, showing the stake in the raised position, Fig. 6 is an enlarged fragmentary view of a portion of my scoot, and Fig. 7 is a cross-sectional view taken along the corresponding section line in Fig. 6.

The embodiment of my invention illustrated in the drawings includes in its general organization a pair of parallel runners 10, a pair of cross ties 12 surmounted on the runners and a pair of bunks 14 overlying the cross ties.

The runners 10 are fabricated from a single length of five inch diameter pipe approximately fourteen feet long. The ends 16 of each of the runner pipes are turned up slightly from the ground level and are closed by caps 18 to prevent them from interfering with the travel of the runners over rough ground. The pipes 10, in addition to serving as runners for the scoot, provide convenient storage space for tools and other equipment. A disc 20 secured within the pipe near the end prevents the stored items from sliding out of reach into the central portions of the runners. This feature of my invention is clearly illustrated in Fig. 3. The undersides of the pipe runners 10 are protected by flat steel shoes 22 which cover their lower surfaces.

A pair of inverted U-shaped seats 24 are welded on the top of each of the runners 10 and support the cross pipes 12. The cross pipes 12, five inches in diameter, are approximately 56 inches long and contain slightly flattened sleeves 26 vertically positioned within the pipes adjacent each end. Pins 28 welded to the pipe runners 10 extend up through the seats 24 and terminate within the sleeves 26 adjacent the upper inner surface of the cross pipes 12. The flattened sleeves 26 prohibit movement of pins 28 laterally of the scoot but allow limited movement of the pins within the sleeves longitudinally of the scoot. Thus while the cross pipes 12 cannot sway appreciably, the structure may be subjected to considerable racking without excessive stresses being applied to the pins 28.

From the foregoing description of the main frame section, it will be apparent that the runners 10 may move translationally relative to each other for the cross ties 12 are pivotally connected to the runners 10 by the sleeves 26 and the pins 28. This parallelogram action of the frame is extremely beneficial because it lends maneuverability to the scoot.

Horizontal metal discs 30 approximately 17 inches in diameter are welded on the center of each of the cross pipes 12. Similar discs 32 welded to the bottom of the bunks 14 overlie the discs 30. Bushings 34 driven through the centers of the bunks 14, the discs 30 and 32 and the upper surface of the cross pipes 12 receive vertical pins 36 which permit relative movement of each pair of discs about its pin 36. The pins 36 extend downwardly through the sleeves 34 and the cross pipes 12 and are retained in position by cotter pins 38. The relative movement of the discs 30 and 32 is limited by a peg 40 fixed to the disc 30 and extending through an arcuate slot 42 in the upper disc 32.

The bunks 14, rigidly secured to the upper discs 32, may be made of 6 inch standard metal channel irons substantially the same length as the cross ties 12. A pin 44 lies across each end of the bunk channels 14 and is anchored at its ends in the upwardly extending channel flanges.

Side stakes 46 pivotally carried by the pins 44 are adapted to extend upwardly from the ends of the bunk channels 14. The side stakes 46 may be made of 5 inch channel and should be sufficiently small to fit between the flanges of bunk channels 14. As is clearly shown in Fig. 6, when the stakes are pivoted inwardly to a horizontal position, they lie within the bunks with the channel flanges of the stakes extending upwardly.

A third set of channels 48 which form part of the tripping mechanism for the stakes 46 are pivotally connected at one end to the bunks 14 by the pins 44. The channels 48 are somewhat smaller than the stakes 46 and their flanges are partially enclosed within the flanges of the stake channels. Removable dowels 50 pass through the free ends of the channels 48 and the flanges of the stakes 46 and preclude the free end of the channels from moving further into the stakes. The dowels comprise removable pins and preferably they are of a length to pass through both flanges of the channels 48 and project outwardly through both flanges of the stakes 46.

In Figs. 1 and 6 the stakes 46 partially containing the channels 48 are illustrated in the horizontal position, lying within the flanges of the bunks 14. When the scoot is used for hauling, the stakes 46 along with the channels 48 are moved to the substantially vertical position shown in Fig. 4. A chain 52 having its ends linked over hooks 54 secured to the sides of the cross ties 12 carries a short length pipe 56, contained within a cylindrical roller 58. To support the stakes 46 in the raised position, the chains 52 are looped around the stakes, and the rollers 58 rest on the ends 60 of the channels 48 which protrude out from between the flanges of the stakes 46 and form shoulders. The dowels 50 prevent the channels 48 from moving further into the stakes 46 and thus insure the existence of seats for the rollers 58.

When it is desired to release the stakes so that they may serve as ramps for loading or unloading the scoot, the dowels 50 are withdrawn from the flanges of the stakes 46 and the channels 48. When the dowels are withdrawn, a light blow against each of the channels 48 causes them to move into the stakes, and the rollers will roll off the seats 60 of the channels 48 and fall to the ground, carrying the chains 52 with them. Because the stakes 46 are inclined slightly outward from the vertical, they will drop outwardly about the pins 44 to the desired position.

My scoot may be connected to a tractor or team of horses by a hitching assembly 62 connected to the ends 16 of the runners 10. The assembly includes a pair of metal rods 64 which carry U-bolts 66 on each of their ends. The U-bolts 66 on one end of each rod are linked with eyes 68 welded on the forward end 16 of each runner 10 while the U-bolts on the other ends of the rods are linked by a ring 70. Stops 72 are welded across the arms of each U-bolt beyond the ends of the rod to prevent the eyes 68 and the ring 70 from exerting a thrust upon the ends of the rods.

Although the stakes 46 serve adequately as ramps for loading and unloading the scoot, I provide a pair of vertical plates 74 on each of the runners which may be employed to support the raised end of separate ramps if for any reason they are used.

From the foregoing description of the illustrated embodiment of my invention it will be appreciated that when the scoot is drawn along the ground, the logs supported longitudinally on the scoot across the bunks 14 do not interfere with the movement of the runners. When the scoot is turned, the outside runner moves slightly ahead of the inner runner without shifting the load on the bunks. The lower discs 30 rigidly secured to the cross pipes 12 are adapted to move relative to the upper discs 32 which support the bunks 14 when the scoot is turned to preserve their original relative positions. Thus while the parallelogram action is afforded the frame by the pivotal connections between the runners 10 and the cross ties 12, the bunks remain perpendicular to the runners.

The tubular construction of the runners 10 and cross ties 12 is most economical and able to sustain very heavy loads, and such construction provides maximum strength with minimum weight. Also the tubular runners provide a line contact abutment with trees and other obstructions, thus reducing friction and possibility of damage to the sled.

Those skilled in the art will appreciate that the illustrated embodiment may be modified without departing from the spirit of my invention. Therefore, it is not my intention to limit the scope of the invention to the specific embodiment illustrated and described, but rather that its breadth be determined by the appended claims and their equivalents.

What I claim as new and desire to secure by Letters Patent of the United States is:

1. Apparatus of the class described comprising a pair of parallel tubular runners, a pair of parallel cross pipes pivotally connected to runners, flat horizontal discs surmounted on the intermediate portions of each of the cross pipes, second horizontal discs concentric with and pivotally mounted on the first named discs, bunks made of channel iron laterally disposed on and rigidly secured to the second discs, said bunk channels facing upwardly from the discs, side channels pivotally connected to the ends of each bunk channel and movable to a horizontal position within the bunk channel, said side channels facing upwardly when positioned horizontally within the bunk channels, third channels pivotally mounted with the side channels on the bunk channels and facing the side channels, a pin removably inserted through the side and third channels holding the third channels partially out of the side channels, and retaining means seated on the ends of the third channels and connected to the cross pipes for holding the side and third channels in an upright position.

2. Apparatus of the class described comprising a pair of parallel runners, a pair of parallel cross ties pivotally connected to each of the runners, a load supporting member pivotally connected on a vertical axis to the center of each of the cross ties, side channels pivotally connected to the ends of the load supporting members, said side channels opening upwardly when pivoted to a horizontal position overlying the load supporting members, second channels pivotally connected with the side channels to the load supporting members, said second channels being shorter than and fitting within the side channels, removable means holding the second channels partially within the side channels to form a seat at the ends of the second channels, means secured to the load supporting members and looped around the side channels and lying on the seats for holding the side channels in a position inclined upwardly and outwardly from the ends of the load supporting members, said side channels being free to fall outwardly and form ramps for the load supporting members when the holding means are removed and the seats are moved into the side channels.

3. A logging sled comprising a pair of spaced and parallel tubular runners upturned at their forward ends, a pair of spaced and parallel load supporting members disposed transversely of and resting at their ends on the runners rearwardly of said upturned ends, vertically disposed means at said ends connecting the members to the runners for limited pivotal movement thereon about vertical axes and disposed to maintain the parallel relationship of the runners and members, a pair of log receiving and supporting members disposed respectively above and substantially parallel with the first named members, and cooperating supports carried by the first and second named members intermediately between the runners for supporting the second named members for limited pivotal movement on the first named members about axes disposed vertically through the supports and members.

4. The logging sled defined in claim 3 in which said load supporting members are tubular and in which said vertically disposed means at each of said ends comprises a tubular sleeve affixed to and disposed transversely within the adjacent tubular member and a pin affixed to a runner and extending vertically upward therefrom into and longitudinally of the tubular sleeve.

5. The logging sled defined in claim 4 in which each tubular sleeve is of ellipitical shape with an inside diameter corresponding substantially to said pin therein transversely of the runner and of a greater diameter longitudinally of the runner.

6. The logging sled defined in claim 3 plus a U-shaped channel iron log confining stake pivoted to each end of each log supporting member for pivotal movement on a horizontal axis to upwardly and downwardly extending positions, a block pivoted to and within each stake, a removable pin in the stake for holding each block in an outer position providing an abutment shoulder, and means cooperating with the stake and shoulder for holding the stake in upwardly extending position when the pin is in place in the stake, removal of said pin permitting pivoting of the block and said shoulder into the stake and movement of said means to non-holding position.

References Cited in the file of this patent

UNITED STATES PATENTS

| 813,420   | Hibbard   | Feb. 27, 1906 |
| 880,982   | Felkey    | Mar. 3, 1908  |
| 1,557,195 | Clapp     | Oct. 13, 1925 |
| 1,852,448 | Chriswell | Apr. 5, 1932  |
| 2,678,220 | Tucker    | May 11, 1954  |
| 2,699,340 | Lee et al.| Jan. 11, 1955 |

FOREIGN PATENTS

| 104,896 | Sweden | June 30, 1942 |
| 107,119 | Sweden | Apr. 13, 1943 |